US011933253B2

(12) United States Patent
Snow

(10) Patent No.: US 11,933,253 B2
(45) Date of Patent: Mar. 19, 2024

(54) AIR CLEANER APPARATUS WITH FASTENER

(71) Applicant: ABC TECHNOLOGIES INC., Toronto (CA)

(72) Inventor: James Dean Snow, Novi, MI (US)

(73) Assignee: ABC TECHNOLOGIES INC. (CA)

( * ) Notice: Subject to any disclaimer, the term of this patent is extended or adjusted under 35 U.S.C. 154(b) by 495 days.

(21) Appl. No.: 17/197,430

(22) Filed: Mar. 10, 2021

(65) Prior Publication Data

US 2021/0207561 A1 Jul. 8, 2021

Related U.S. Application Data

(63) Continuation-in-part of application No. PCT/US2020/061959, filed on Nov. 24, 2020.

(60) Provisional application No. 62/939,865, filed on Nov. 25, 2019.

(51) Int. Cl.

| | |
|---|---|
| ***F02M 35/02*** | (2006.01) |
| ***F02M 35/024*** | (2006.01) |
| ***F02M 35/14*** | (2006.01) |
| ***F02M 35/16*** | (2006.01) |

(52) U.S. Cl.

CPC .. *F02M 35/0205* (2013.01); *F02M 35/02416* (2013.01); *F02M 35/16* (2013.01)

(58) Field of Classification Search

CPC ......... F01M 35/0205; F01M 35/02416; F01M 35/16; F01M 35/0201; F01M 35/0203; F01M 35/02491; F01M 35/02425; B01D 46/0002; B01D 46/0005

USPC ............. 55/385.3, 495, 402, 511; 123/198 E

See application file for complete search history.

(56) References Cited

U.S. PATENT DOCUMENTS

| | | | | |
|---|---|---|---|---|
| 5,295,602 | A * | 3/1994 | Swanson | F02M 35/0203 55/502 |
| 5,569,311 | A | 10/1996 | Oda et al. | |
| 5,730,768 | A * | 3/1998 | Kaminaga | F02M 35/02491 55/502 |
| 8,394,159 | B2 * | 3/2013 | Schrewe | B01D 46/521 55/480 |
| 9,981,213 | B2 * | 5/2018 | Endo | B01D 46/10 |
| 10,662,905 | B2 * | 5/2020 | Dirnberger | F02M 35/02491 |
| 2007/0251392 | A1 * | 11/2007 | Tschech | F02M 35/0203 96/147 |

(Continued)

OTHER PUBLICATIONS

International Search Report dated Feb. 17, 2021 in International Patent Application No. PCT/US2020/061959.

(Continued)

*Primary Examiner* — Frank M Lawrence, Jr.

(74) *Attorney, Agent, or Firm* — McDonald Hopkins LLC

(57) ABSTRACT

Provided is an air cleaner apparatus for an automotive air induction system. The apparatus includes a housing having an upper housing member and a lower housing member. An inlet is provided on the lower housing member, while an outlet is provided on the upper housing member. The apparatus also includes a replaceable serviceable filter. The upper housing member and the lower housing member are connected at an interface therebetween to define an internal volume. The filter is mounted within the internal volume proximal the interface. The upper and lower housing members are maintained in an assembled state using a serviceable latch assembly.

17 Claims, 19 Drawing Sheets

(56) References Cited

U.S. PATENT DOCUMENTS

| | | | | |
|---|---|---|---|---|
| 2010/0043367 | A1 | 2/2010 | Desjardins | |
| 2012/0192535 | A1* | 8/2012 | Schrewe .............. | B01D 46/521<br>16/382 |
| 2012/0240540 | A1 | 9/2012 | Metzger et al. | |
| 2013/0239531 | A1 | 9/2013 | Koda | |

OTHER PUBLICATIONS

Written Opinion of the International Searching Authority dated Feb. 17, 2021 in International Patent Application No. PCT/US2020/061959.

* cited by examiner

AIR CLEANER APPARATUS WITH FASTENER

CROSS-REFERENCE TO RELATED APPLICATIONS

This application is a continuation in part of International Application No. PCT/US2020/061959, filed Nov. 24, 2020, which claims the benefit of U.S. Provisional Application No. 62/939,865, filed Nov. 25, 2019, each of which is hereby incorporated by reference in its entirety for all purposes.

FIELD OF THE INVENTION

The present invention generally relates to the field of automotive air induction systems, and in particular to an automotive air cleaner apparatus having an improved fastener design.

BACKGROUND OF THE INVENTION

An air induction system of an automobile includes an airbox to cleanse the air to be delivered into an engine, generally via the throttle body and intake manifold. The airbox is configured to house an air filter, situated between its inlet and outlet ends, the air filter serving to remove dusts, debris, etc. from the stream of air passing therethrough, and an optional component for hydrocarbon adsorption that can be either flow through or flow by airflow. The air filter is a serviceable/replaceable component of the air induction system, requiring that the airbox periodically be opened. Accordingly, airboxes typically incorporate a plurality of threaded fasteners that permit for periodic opening/closure of the airbox as necessary to access the air filter.

The use of threaded fasteners on prior airbox assemblies can be cumbersome, with such fasteners being prone to stripping the thread in the airbox, being lost or falling into the engine compartment, increasing the time and potentially cost required to complete the servicing of the air induction system. Accordingly, there is a need to provide a fastening system for automotive airboxes that is less prone to these noted disadvantages.

SUMMARY OF THE INVENTION

According to an aspect of an embodiment, provided is an air cleaner apparatus for an automotive air induction system. The apparatus includes a housing having an upper housing member and a lower housing member. An inlet is provided on the lower housing member, while an outlet is provided on the upper housing member. The apparatus also includes a replaceable serviceable filter. The upper housing member and the lower housing member are connected at an interface therebetween to define an internal volume. The filter is mounted within the internal volume proximal the interface. The upper and lower housing members are maintained in an assembled state using a serviceable latch assembly.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to an air cleaner in an automotive air induction system, the invention may be applied in other automotive and non-automotive applications. Furthermore, there is no intention to be bound by any expressed or implied theory presented in the preceding technical field, brief summary or the following detailed description.

Air Cleaner Apparatus

Figure 1A:
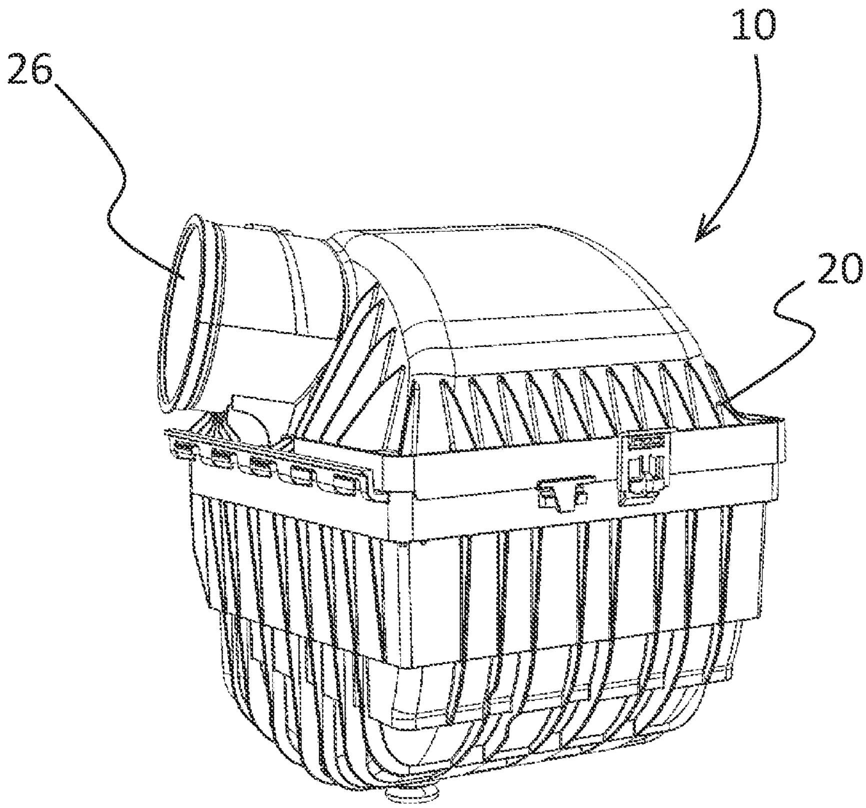
FIG. 1*a* is a perspective view of an air cleaner assembly in accordance with a first embodiment of the invention, showing a first side.
Figure 1B:
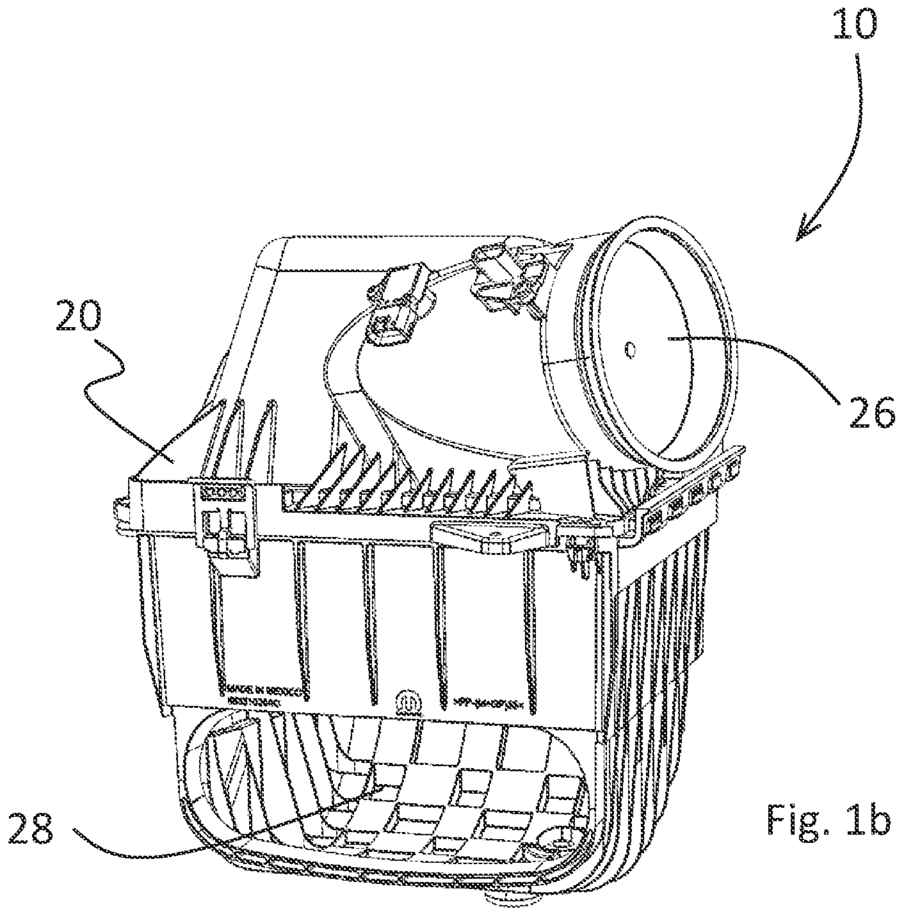
FIG. 1*b* is a perspective view of the air cleaner assembly of FIG. 1*a*, showing a second side.
Figure 2:
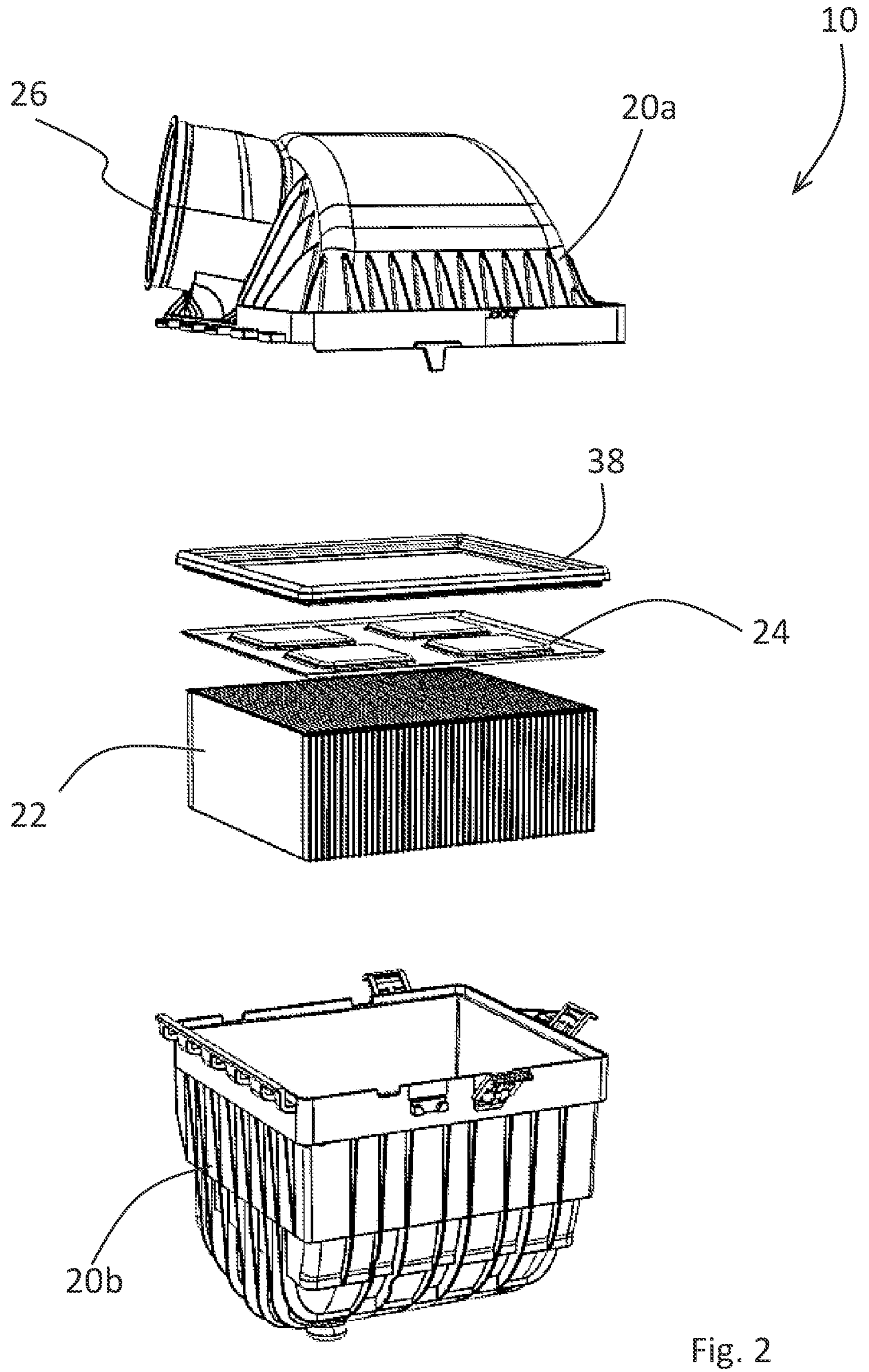
FIG. 2 is an exploded perspective view of the air cleaner assembly of FIG. 1*a*.

Turning now to FIGS. 1*a*, 1*b* (assembled; 2 views) and FIG. 2 (exploded), shown is an air cleaner apparatus 10 configured in accordance with an embodiment of the invention. The air cleaner apparatus 10 forms a part of the automotive air induction system and is generally positioned in communication with an inlet that receives air from outside the engine compartment and the throttle body of the engine air intake system. As shown, the air cleaner apparatus includes a housing 20 and a replaceable serviceable filter 22. The housing 20 is constructed in a manner to be openable, thus permitting the replacement/servicing of the filter 22 when necessary. As shown, the housing 20 includes an upper housing member 20*a* and a lower housing member 20*b* that collectively define an internal volume that receives the filter 22. The filter 22 is mounted within the housing 20 using a porous filter frame 24. The lower housing member 20*b* includes an inlet 28, while the upper housing member 20*a* includes an outlet 26. The housing 20 is constructed in a manner to position the filter frame 24, and therein the filter 22 proximal an interface situated between the upper and lower housing members 20*a*, 20*b*. In this way, the filter 22 is positioned in the flow path of air travelling from the inlet 28 through to the outlet 26, thereby cleaning the air prior to entry into the engine air intake system.

Interface

Figure 3:
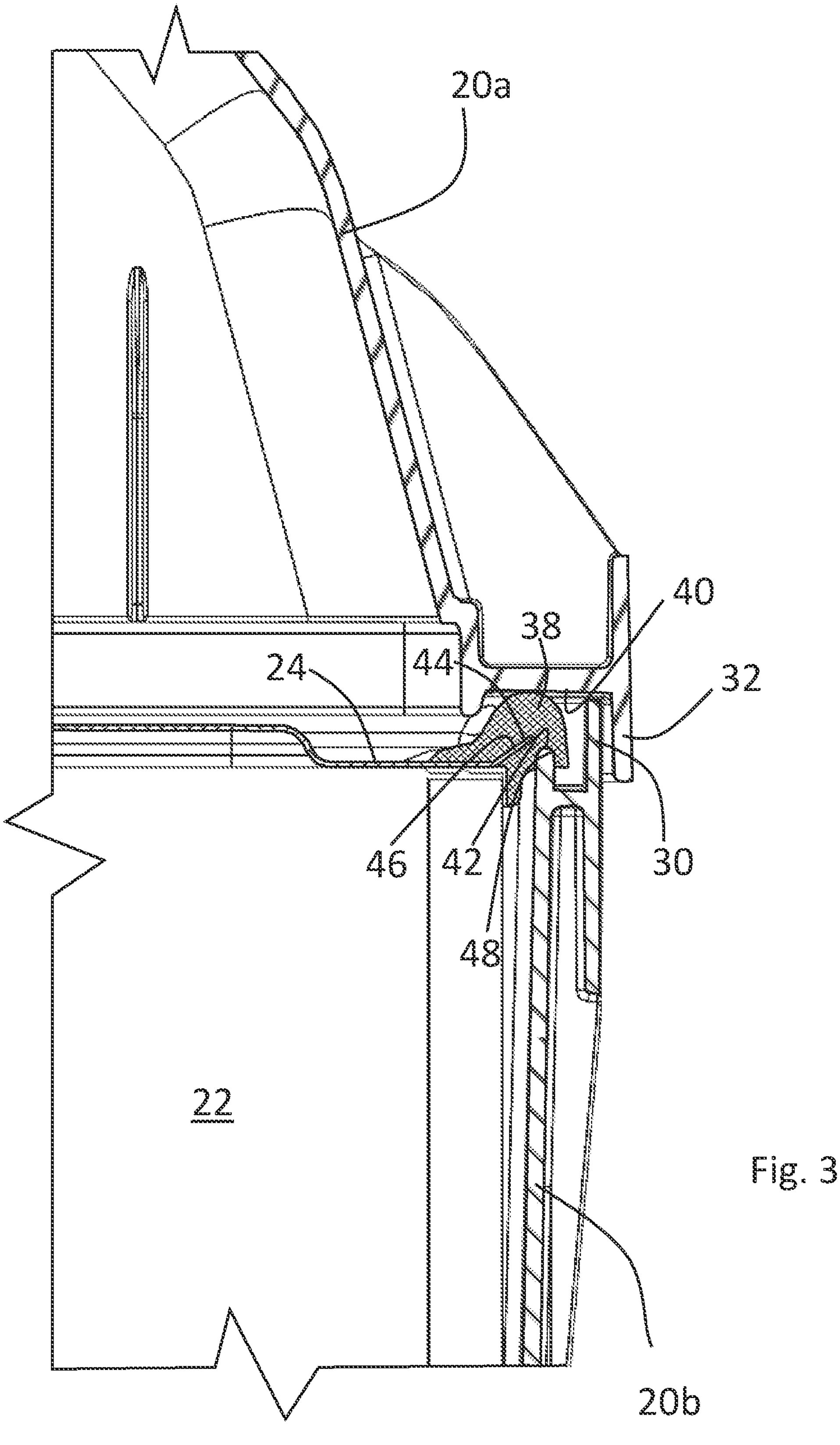
FIG. 3 is a partial sectional view of the air cleaner assembly of FIG. 1*a*, showing the housing in the closed position.

With reference now to FIG. 3, shown in greater detail is the interface between the upper and lower housing members 20*a*, 20*b*. The lower housing member 20*b* includes a lower vertical flange 30 that cooperates with an upper vertical flange 32 provided on the upper housing member 20*a*. The upper vertical flange 32 is dimensionally configured to overlap the lower vertical flange 30, to assist in preventing the ingress of water and debris into the assembled housing 20. The housing 20 additionally includes a compressible peripheral seal 38 that abuts and compresses between an upper sealing surface 40 provided on the upper housing member 20*a*, and a lower sealing surface 42 provided on the lower housing member 20*b*. In the assembled state, the peripheral seal 38 additionally prevents the ingress of water and debris into the housing 20. The establishment of a sealed interface also ensures that the flow of incoming air into the housing 20 through the inlet 28 passes through the filter 22 towards the outlet 26, without any leaks to the exterior at the interface between the upper and lower housing members 20*a*, 20*b*.

The seal 38 is configured with a flange slot 44, to receive a filter flange 46 extending around the periphery of the porous filter frame 24, to ensure the filter 22 remains seated at the interface between the upper and lower housing members 20*a*, 20*b*. It will be apparent that the lower sealing surface 42 of the lower housing member 20*b* cooperates with a sealing groove 48 on the seal 38, to securely register the seal 38 at the interface in the assembled housing 20.

Registration Feature

Figure 4:
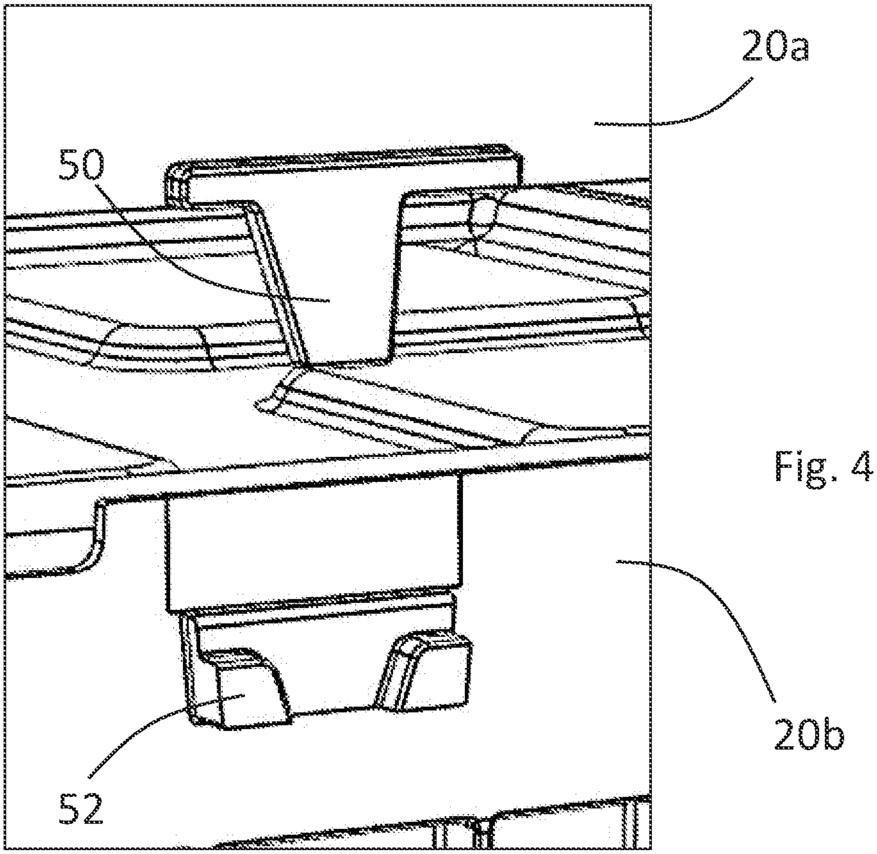
FIG. 4 is a partial perspective view of the air cleaner assembly of FIG. 1*a*, showing a retention feature when the air cleaner is in the open position.
Figure 5:
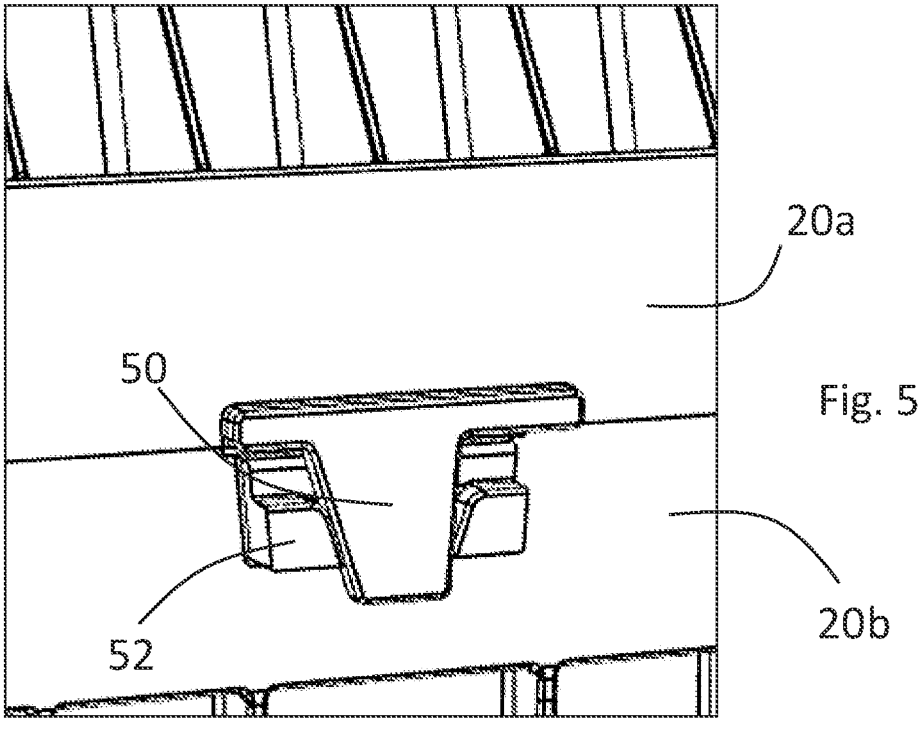
FIG. 5 is a partial perspective view of the air cleaner assembly of FIG. 1*a*, showing the retention feature of FIG. 4 when the air cleaner is in the closed position.

In some embodiments, the upper and lower housing members 20*a*, 20*b* will include additional registration features to facilitate proper alignment of the upper and lower housing members 20*a*, 20*b* during assembly. As shown in FIG. 4 (open state) and FIG. 5 (closed state), the upper housing member 20*a* includes at least one registration tab 50 that is configured to cooperate with a corresponding registration receptacle 52 provided on the lower housing member 20*b*, proximal the interface therebetween. The registration tab 50 is provided with a tapered profile that narrows towards the distal end. The registration receptacle 52 is provided with a complementary tapered pocket. On assembly of the housing 20, the tapered registration tab 50 seats within the similarly tapered registration receptacle 52, to ensure alignment of the upper and lower housing members 20*a*, 20*b* at the interface.

Latch—Version 1

Figure 6:
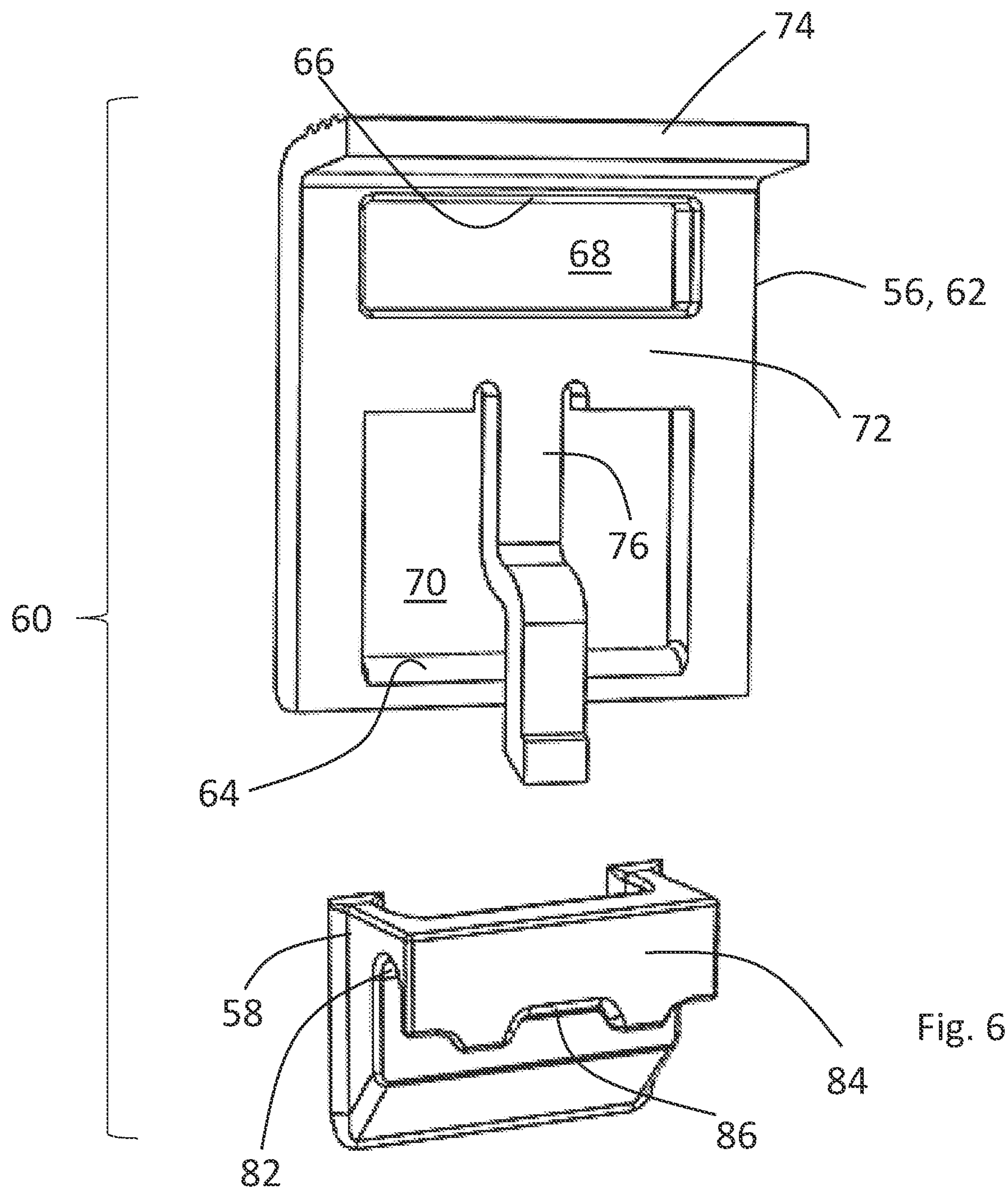
FIG. 6 is a perspective view of a latch assembly implemented on the air cleaner assembly of FIG. 1*a*, shown in isolation.

With reference now to FIG. 6, shown in isolation is a latch 56 and a latch bracket 58, that together define a latch assembly 60. The latch assembly 60 is operably mounted on the lower housing member 20*b* and is configured to cooperate with a keeper on the upper housing member 20*a*, to maintain the upper and lower housing members 20*a*, 20*b* in the assembled (closed) state. The latch 56 includes a latch body 62 that is unitary in construction. The latch body includes a pivot bar 64, a catch member 66 opposite the pivot bar 64, a first catch aperture 68, and a second catch aperture 70, where the first and second catch apertures 68, 70 are separated by a cross member 72. Extending from the catch member 66 is a grasp tab 74 to permit a user to manipulate the latch 56 during usage. In the embodiment shown, the cross member 72 includes an extension member 76.

The latch 56 cooperates with and is pivotable on the latch bracket 58 provided proximal an upper edge of the lower housing member 20*b*. The latch bracket 58 includes a pivot bar pocket 82 to receive the pivot bar 64 of the latch 56. The pivot bar pocket 82 also serves to define a bracket wall 84 that provides a bearing cut-out 86. The bearing cut-out 86 cooperates with the extension member 76 of the latch 56, as will be described in greater detail below.

Figure 7:
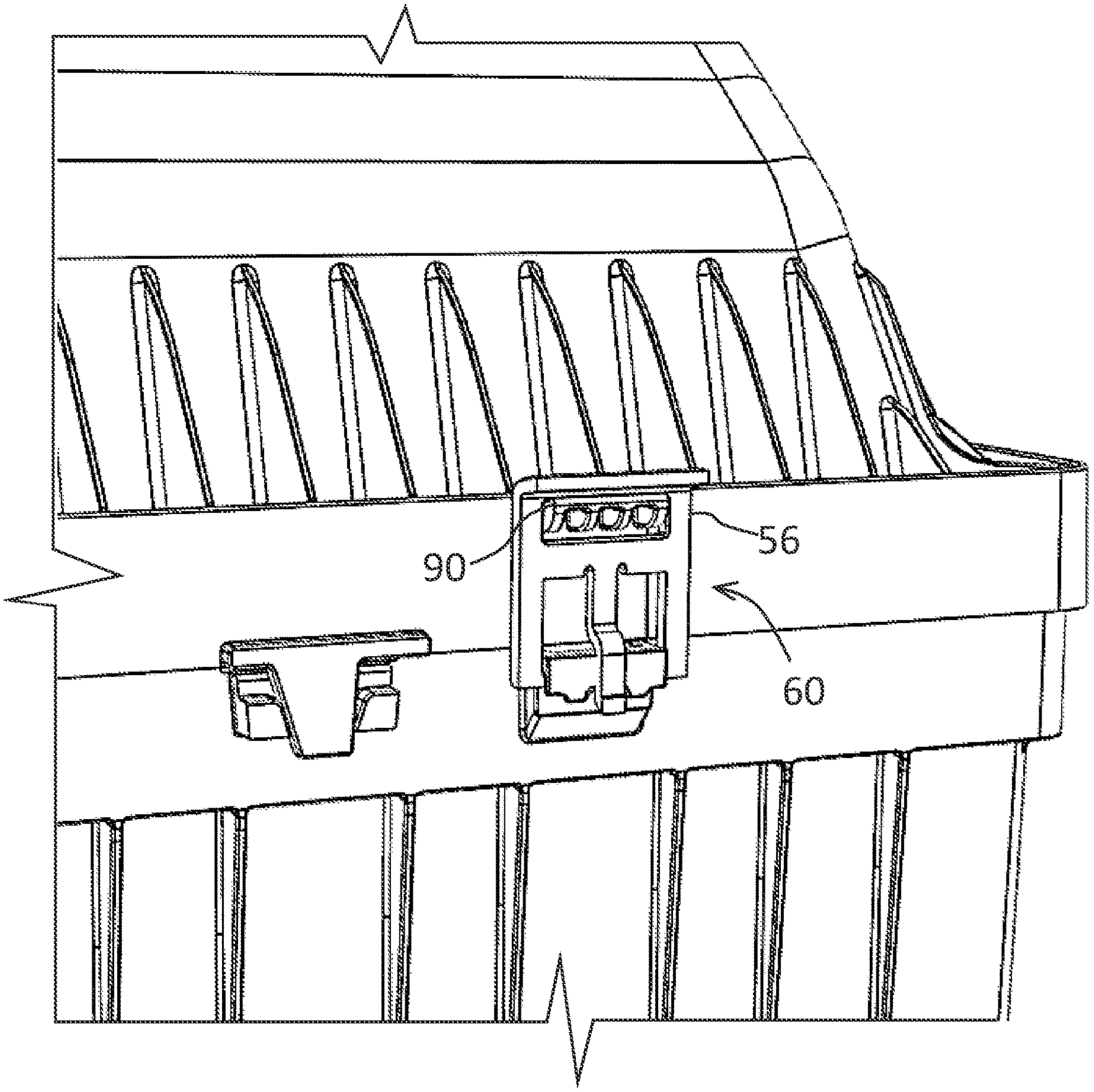
FIG. 7 is a partial perspective view of the latch assembly of FIG. 6, shown with the air cleaner assembly in the closed position.

The latch assembly 60 is shown in the assembled state in FIG. 7, with the housing 20 and the latch assembly 60 shown in the closed condition. In the closed condition, the catch member 66 of the latch 56 engages the keeper 90 provided on the upper housing member 20*a*. In general, the dimensional properties of the latch 56, and in particular the distance from the pivot bar 64 to the catch member 66 is selected to achieve a desired compression of the seal 38. For instance, the sizing of the latch 56 may be chosen to establish a 20% to 40% compression of the seal 38 upon closure of the housing 20.

Figure 8A:
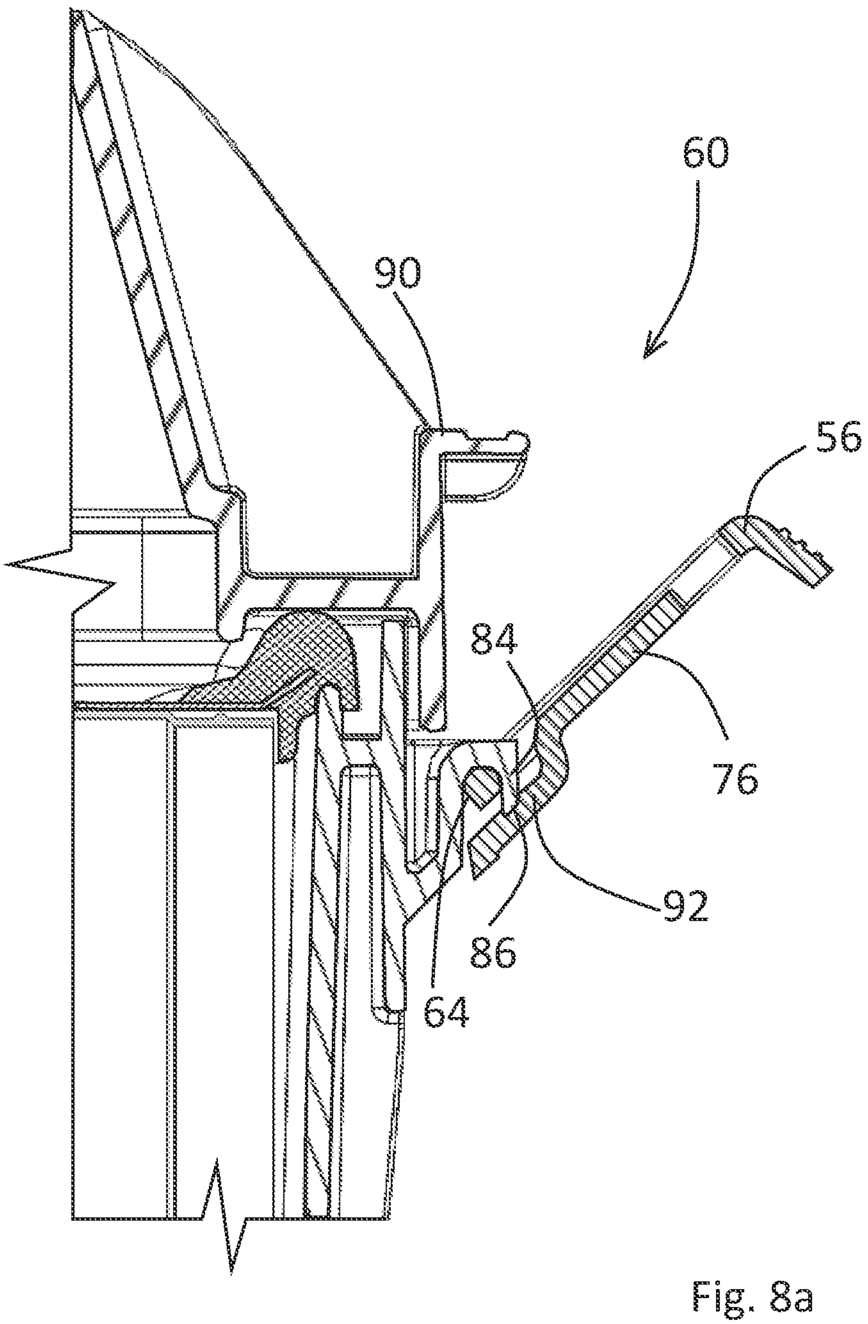
FIG. 8*a* is a partial sectional view of the latch assembly of FIG. 6, shown with the latch assembly in the open position.
Figure 8B:
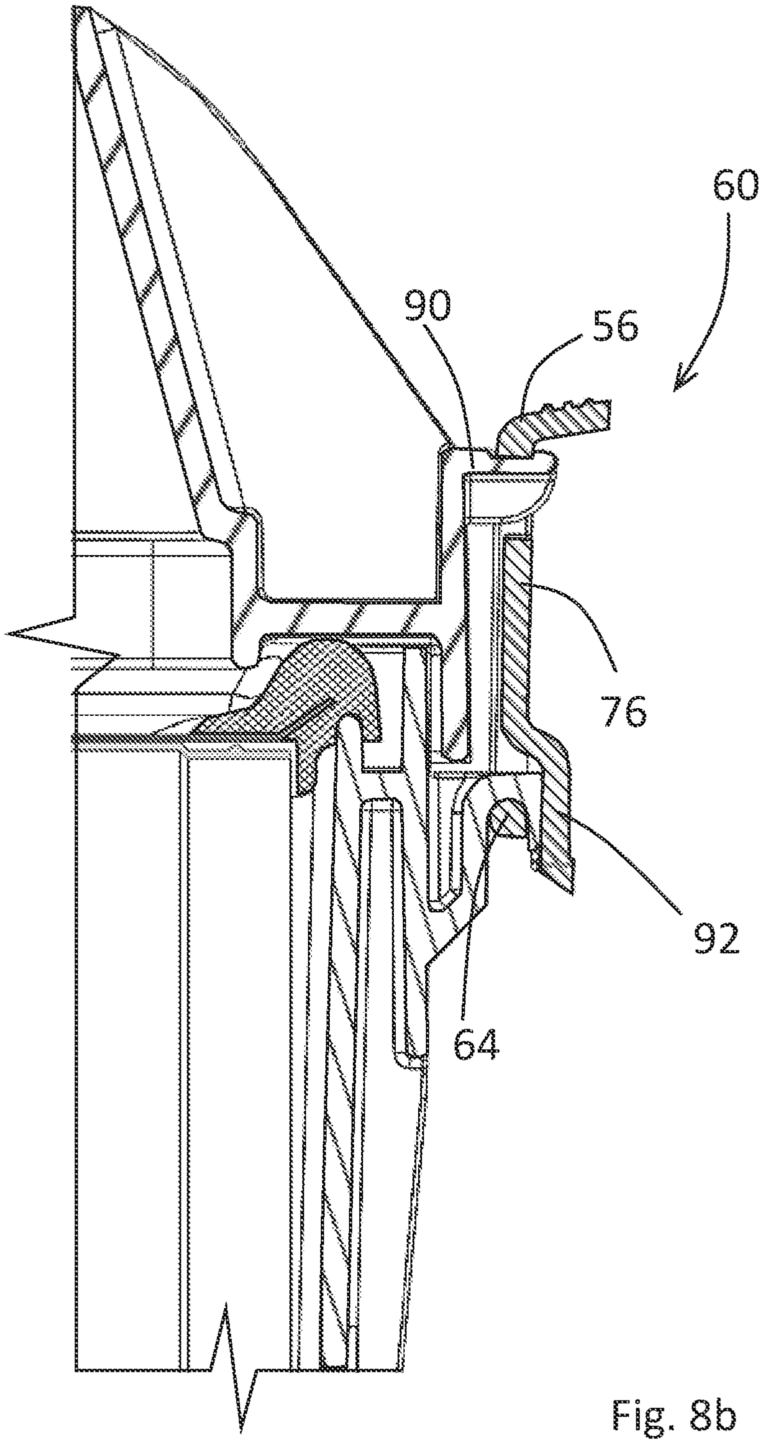
FIG. 8*b* is a partial sectional view of the latch assembly of FIG. 6, shown with the latch assembly in the closed position.

For further discussion, the operation of the latch assembly 60 is shown in FIG. 8*a* (open) and FIG. 8*b* (closed). In the open condition (FIG. 8*a*), the latch 56 is shown rotated approximately 45° and therein disengaged from the keeper 90 provided on the upper housing member 20*a*. The latch 56 is maintained in this rotated disengaged position through a compressive force applied by the extension member 76 upon the bracket wall 84. In particular, the extension member 76 includes an offset portion 92 that is dimensioned to apply a compressive force upon the cut-out 86 of the bracket wall 84 upon being rotated. The compressive force applied by the offset portion 92 of the extension member 76 is received upon an inside surface the bracket wall 84 (via the pivot bar 64) and an outside surface of the bracket wall 84, in particular at the cut-out 86, so as to frictionally maintain the latch 56 in position in the disengaged condition. On being rotated to the engaged position, as shown in FIG. 8*b*, the keeper 90 provided on the upper housing member 20*a* passes through the first catch aperture 68, with the catch member 66 being received upon the keeper 90, therein holding the latch 56 in the engaged position.

Latch—Version 2

Figure 9:
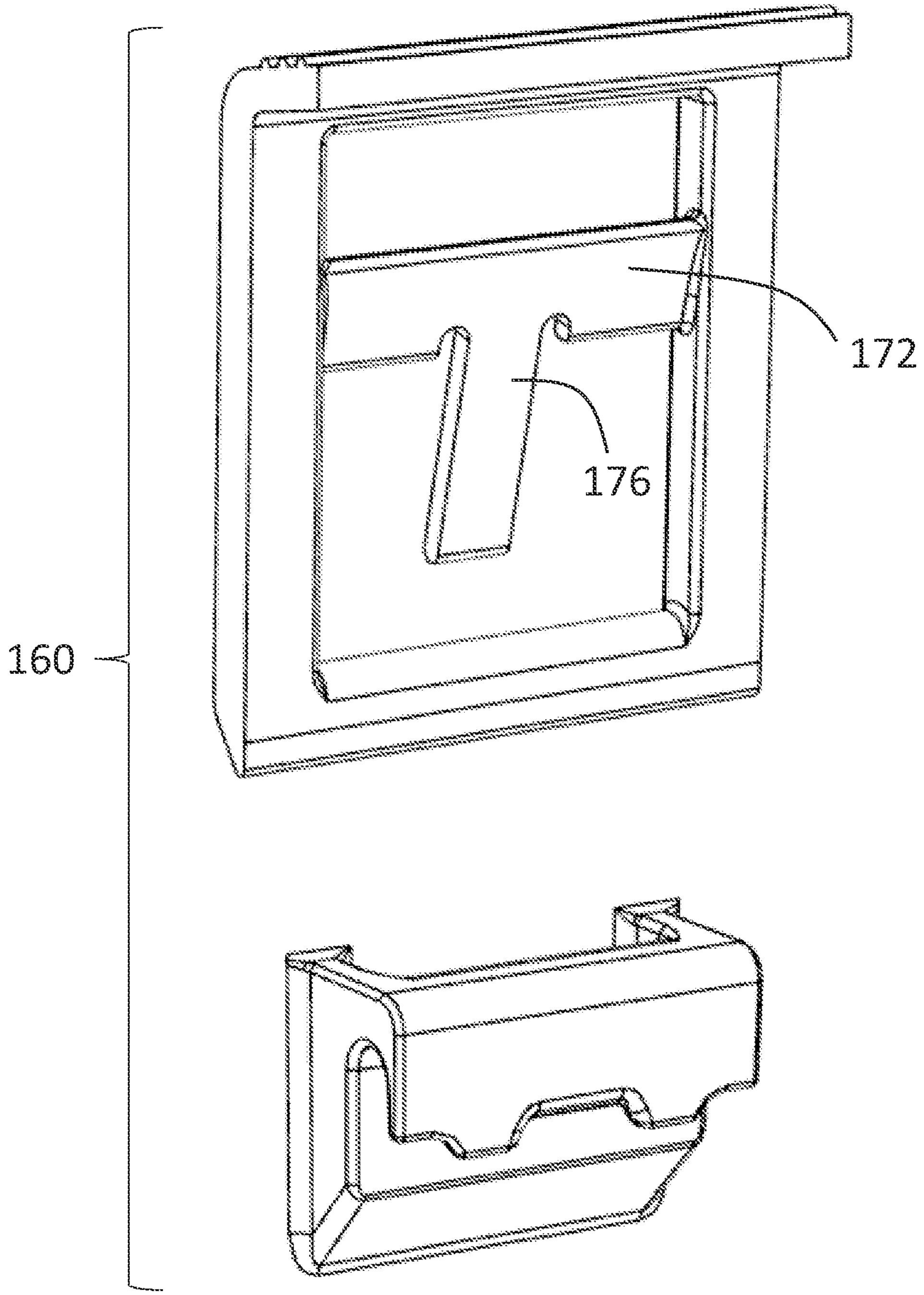
FIG. 9 is a perspective view of an alternative embodiment of a latch assembly, shown in isolation.

With reference now to FIG. 9, shown is an alternative embodiment for the latch assembly 160. The latch assembly 160 is configured in much the same way as the latch assembly 60 of the previous embodiment, and as such, only differences will be further detailed herein.

The latch assembly 160 provides an alternative structure for the extension member 76 of the previous embodiment. Instead of the extension member 76, the latch assembly provides a retention tab 176 that extends from the cross member 172.

Figure 10:
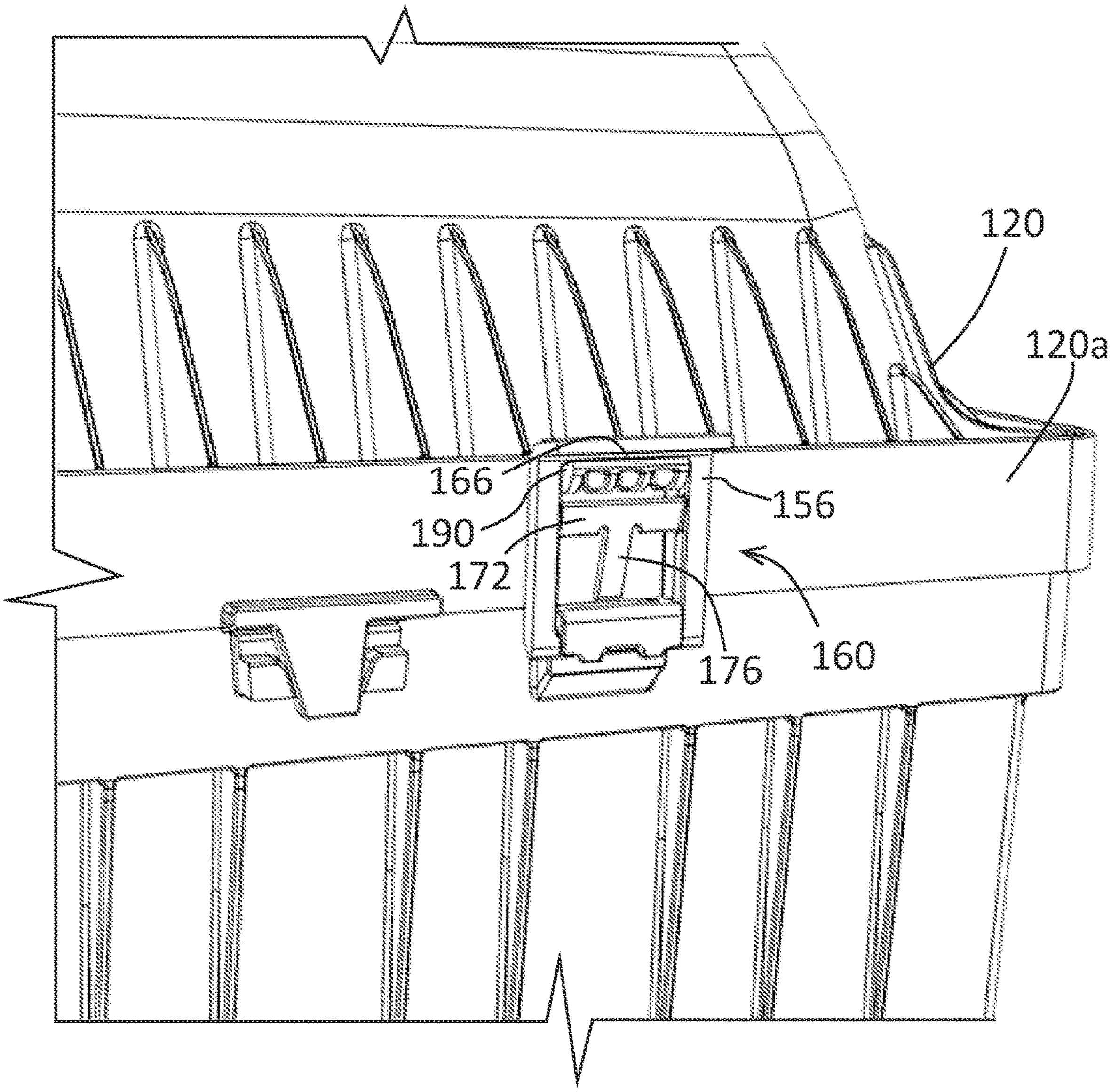
FIG. 10 is a partial perspective view of the latch assembly of FIG. 9, shown with the air cleaner assembly in the closed position.

The latch assembly 160 is shown in the assembled state in FIG. 10, with the housing 120 and the latch assembly 160 shown in the closed condition. In the closed condition, the catch member 166 of the latch 156 engages the keeper 190 provided on the upper housing member 120*a*. As better viewed in FIG. 10, the retention tab 176 extends downwardly from the cross member 172, and towards the housing 120.

Figure 11A:
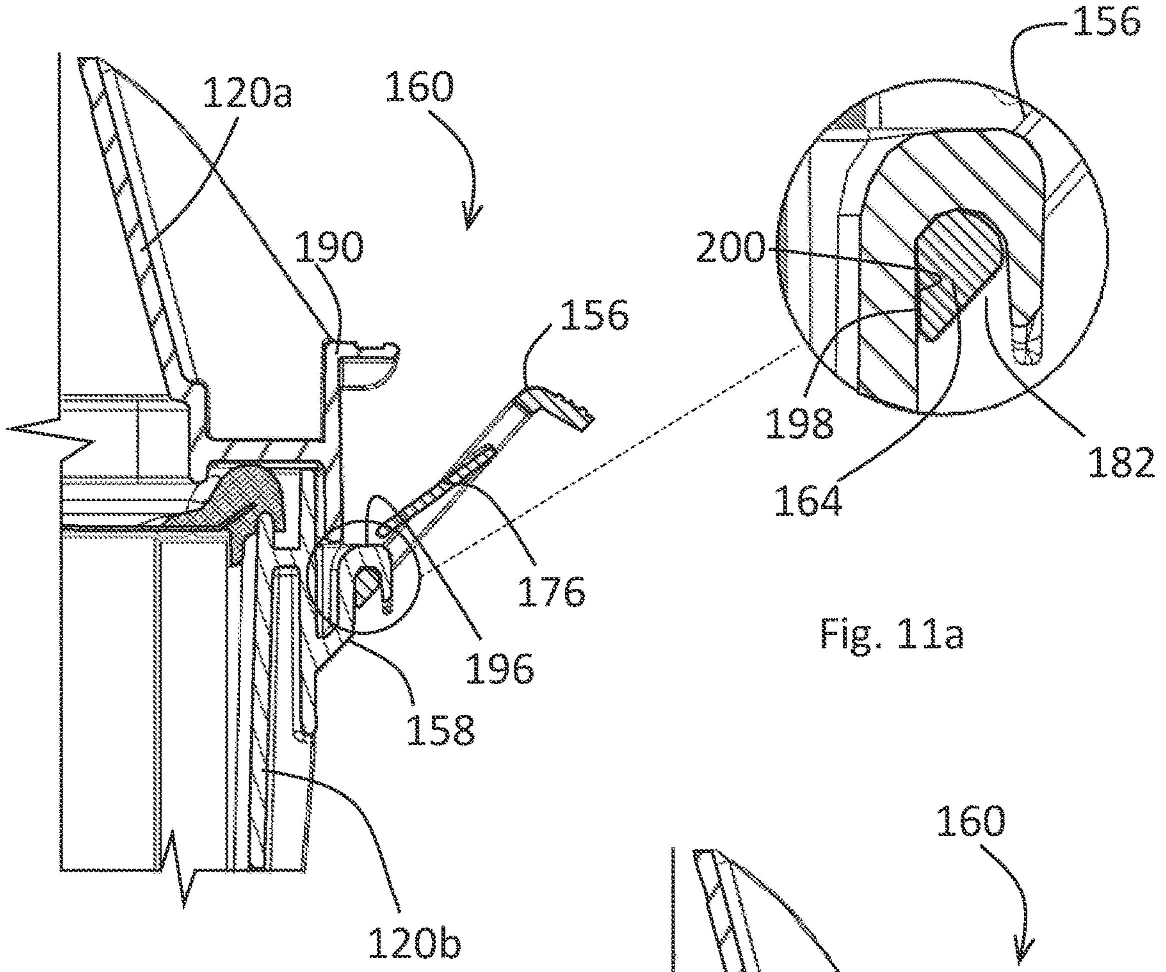
FIG. 11*a* is a partial sectional view of the latch assembly of FIG. 9, shown with the latch assembly in the open position.
Figure 11B:
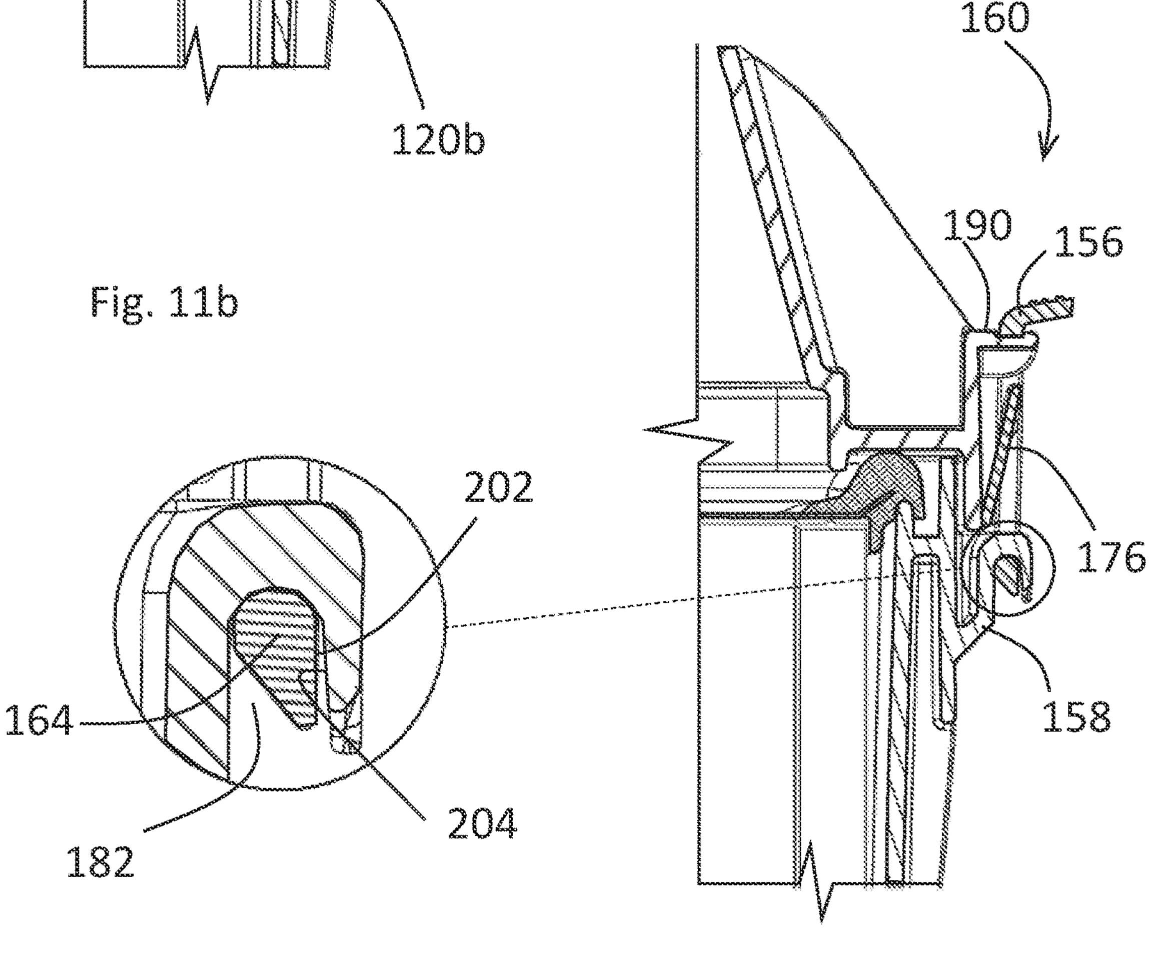
FIG. 11*b* is a partial sectional view of the latch assembly of FIG. 9, shown with the latch assembly in the closed position.

For further discussion, the operation of the latch assembly 160 is shown in FIG. 11*a* (open) and FIG. 11*b* (closed). In the open condition (FIG. 11*a*), the latch 156 is shown rotated approximately 45° and therein disengaged from the keeper 190 provided on the upper housing member 120*a*. The latch 156 is maintained in this rotated disengaged position without falling away from the latch bracket 158 through an interference/obstruction fit provided by the retention tab 176. As shown, the retention tab 176 is dimensioned with a length that keeps it obstructed by an upper wall surface 196 of the latch bracket 158. In this way, the latch 156 cannot fall off the latch bracket 158 when in the 45° position, as shown. In addition, to keep the latch 156 from rotating beyond the approximately 45° shown, the pivot bar 164 of the latch 156 is provided with a first pivot surface 198 that engages a first bearing wall 200 within the pivot bar pocket 182 of the latch bracket 158. On being rotated to the engaged position, as shown in FIG. 11*b*, the catch member 166 provided on the latch 156 is received upon the keeper 190, therein holding the latch 156 in the engaged position. In this position, a second pivot surface 202 provided on the pivot bar 164 engages a second bearing wall 204 within the pivot bar pocket 182.

Latch—Version 3

Figure 12:
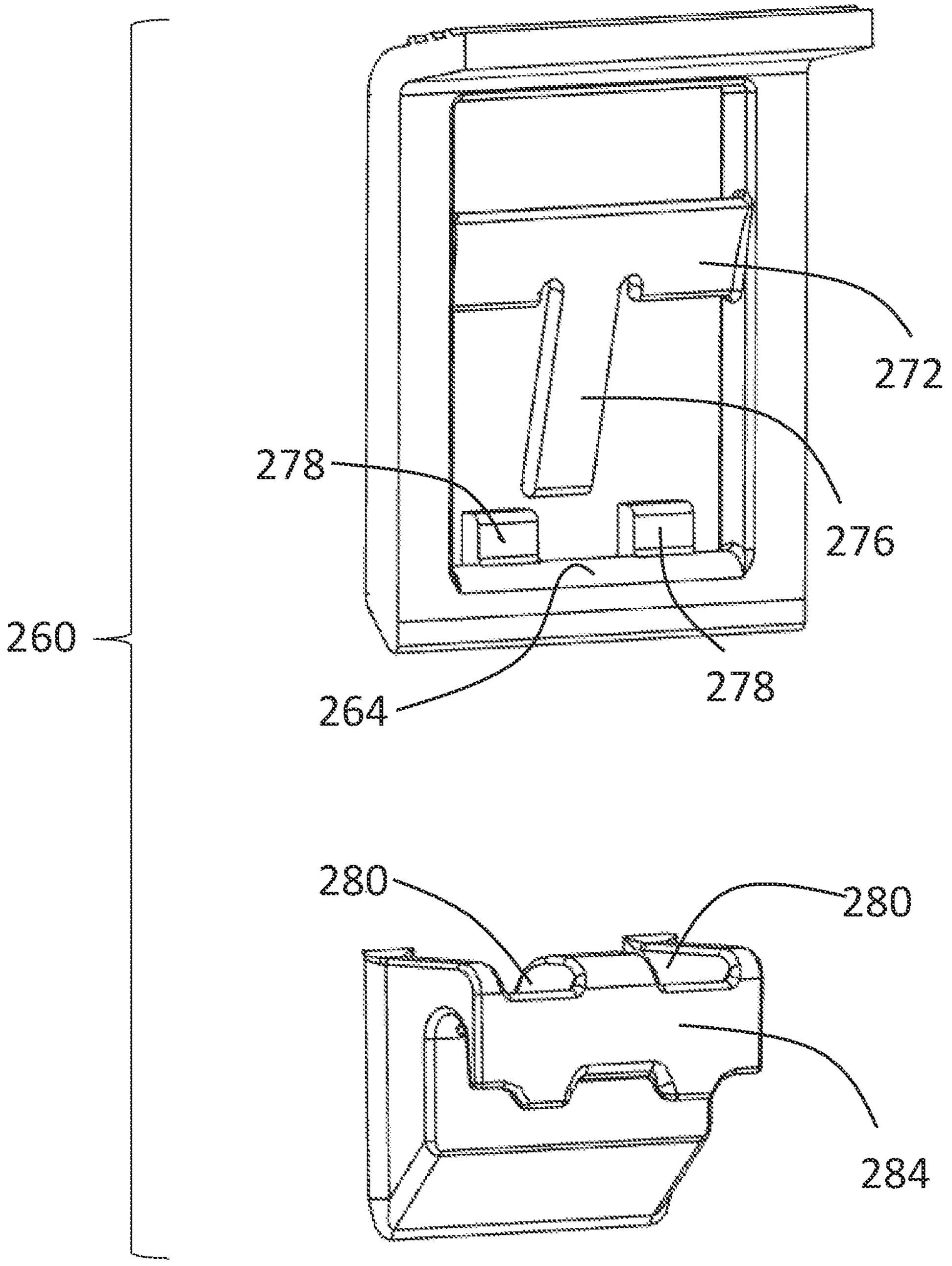
FIG. 12 is a perspective view of another alternative embodiment of a latch assembly, shown in isolation.

With reference now to FIG. 12, shown is another alternative embodiment for the latch assembly 260. The latch assembly 260 is configured in much the same way as the latch assembly 160 of the previous embodiment, and as such, only differences will be further detailed herein.

Similar to the previous latch assembly 160, the latch assembly 260 provides an alternative structure for the extension member 76 of the first embodiment. Instead of the extension member 76, the latch assembly 260 provides a retention tab 276 that extends from the cross member 272 in the direction of the pivot bar 264. The latch assembly 260 also provides a pair of stop tabs 278 extending from the pivot bar 264 in the direction of the cross member 272. Each of the stop tabs 278 is configured to seat in a corresponding stop tab aperture 280 provided in the bracket wall 284.

Figure 13:
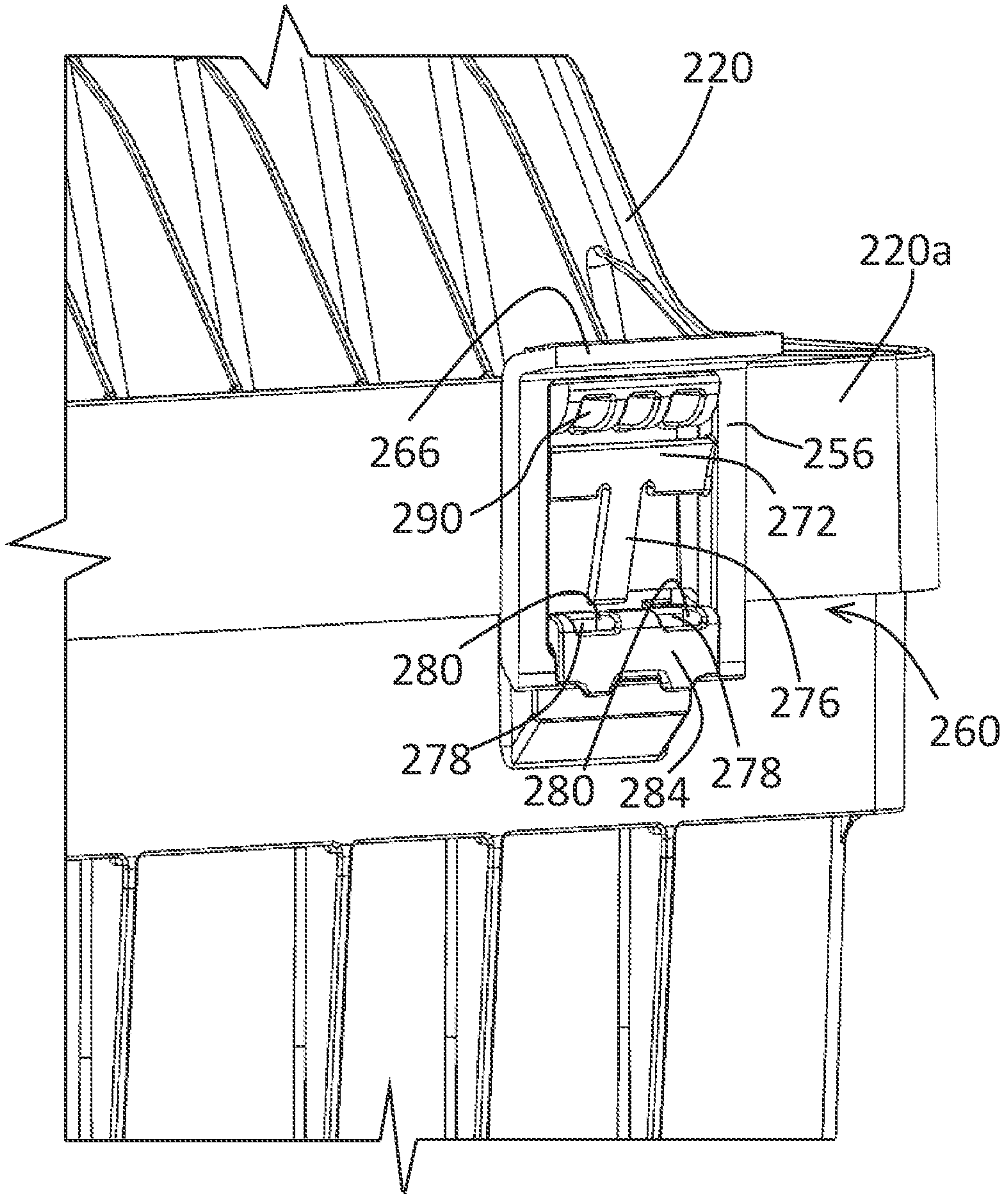
FIG. 13 is a partial perspective view of the latch assembly of FIG. 12, shown with the air cleaner assembly in the closed position.

The latch assembly 260 is shown in the assembled state in FIG. 13, with the housing 220 and the latch assembly 260 shown in the closed condition. In the closed condition, the catch member 266 of the latch 256 engages the keeper 290 provided on the upper housing member 220*a*. In this assembled and closed state, the retention tab 276 extends downwardly from the cross member 272, and towards the housing 220. Also visible is the positioning of the stop tabs 278 in the corresponding stop tab apertures 280 provided in the bracket wall 284.

Figure 14A:
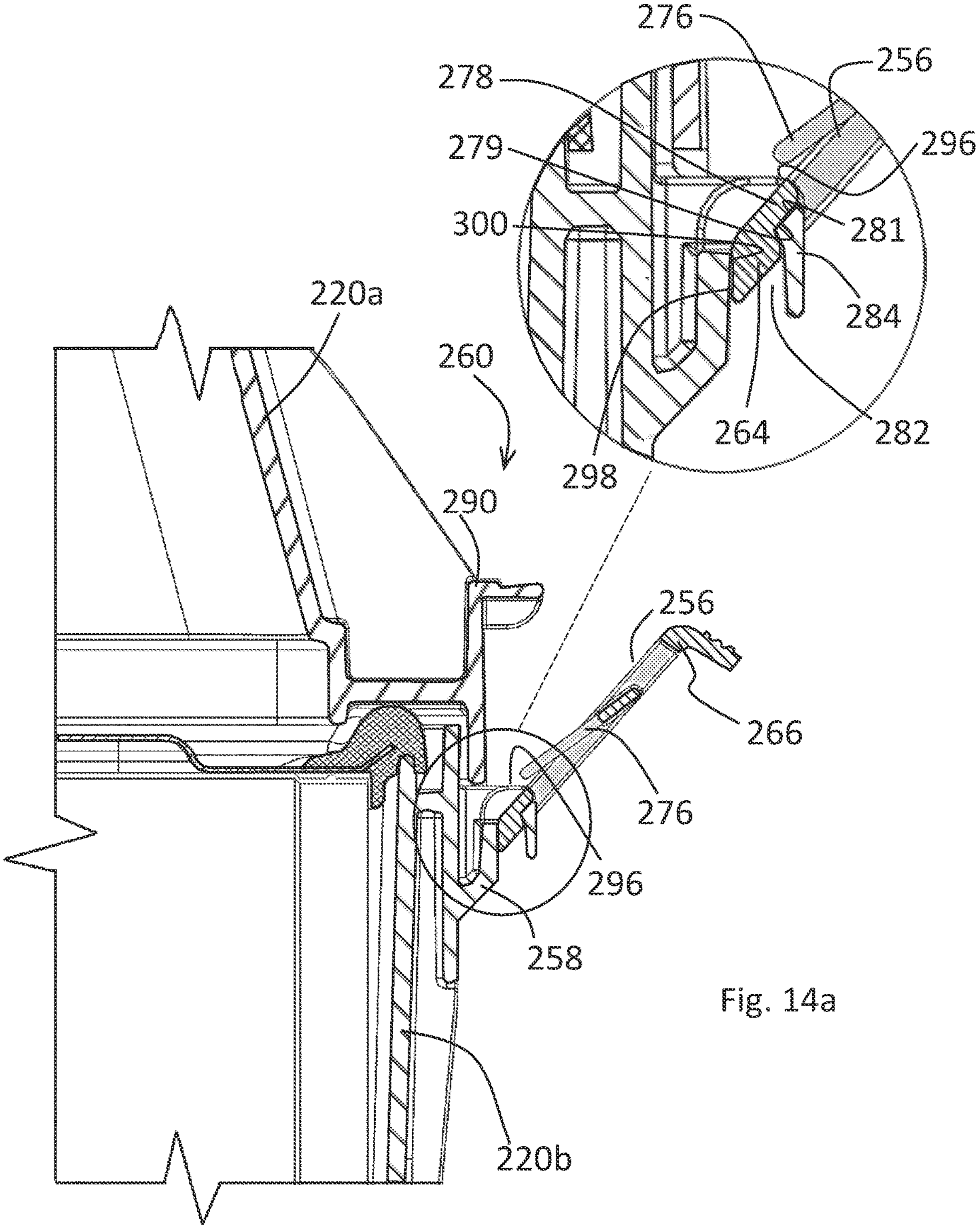
FIG. 14*a* is a partial sectional view of the latch assembly of FIG. 12, shown with the latch assembly in the open position.
Figure 14B:
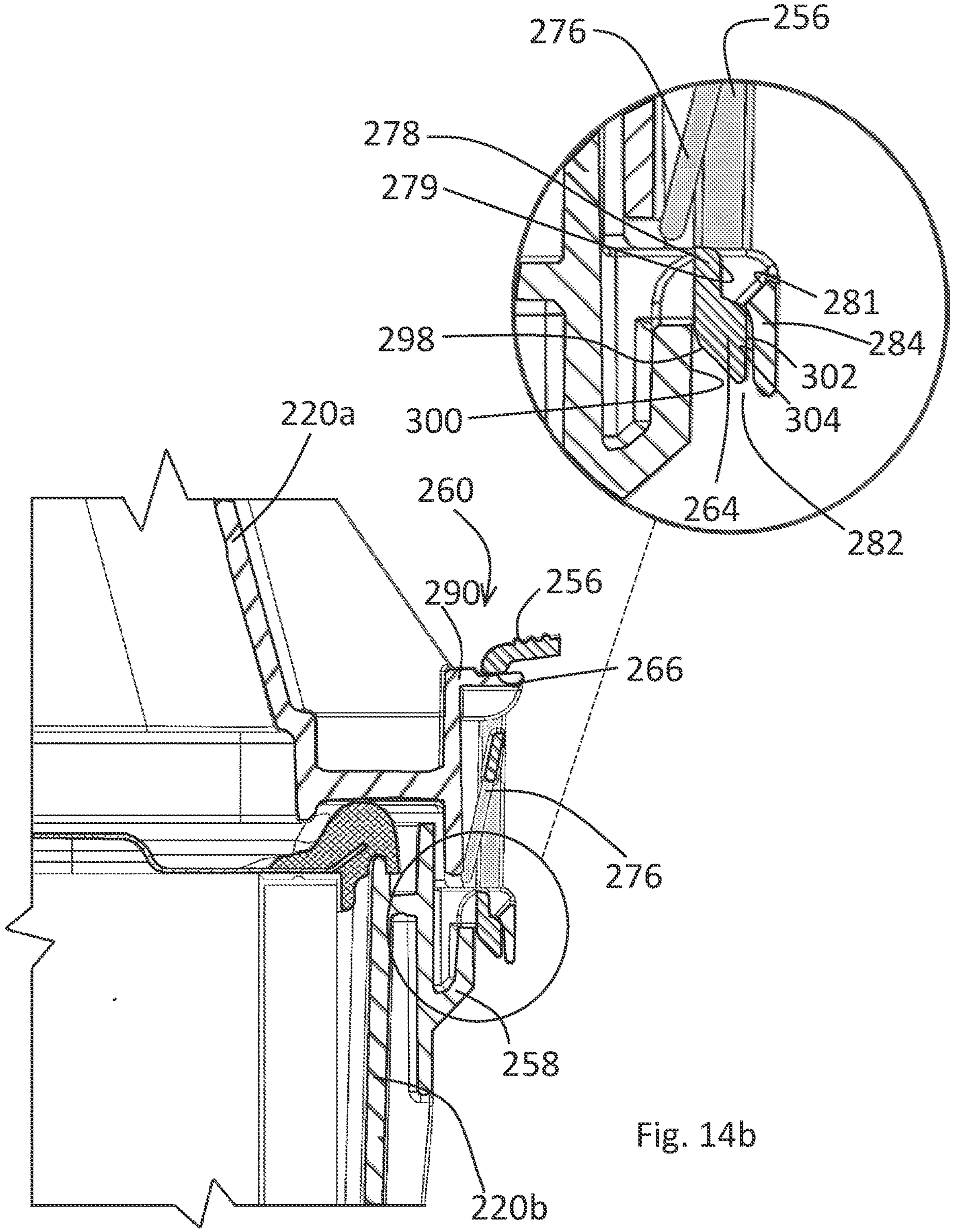
FIG. 14*b* is a partial sectional view of the latch assembly of FIG. 12, shown with the latch assembly in the closed position.

For further discussion, the operation of the latch assembly 260 is shown in FIG. 14*a* (open) and FIG. 14*b* (closed). In the open condition (FIG. 14*a*), the latch 256 is shown rotated approximately 45° and therein disengaged from the keeper 290 provided on the upper housing member 220*a*. The latch 256 is maintained in this rotated disengaged position without falling away from the latch bracket 258 through an interference/obstruction fit provided by the retention tab 276. As shown, the retention tab 276 is dimensioned with a length that keeps it obstructed by an upper wall surface 296 of the latch bracket 258. In this way, the latch 256 cannot fall off the latch bracket 258 when in the 45° position, as shown. In addition, to keep the latch 256 from rotating beyond the approximately 45° shown, the pivot bar 264 of the latch 256 is provided with a first pivot surface 298 that engages a first bearing wall 300 within the pivot bar pocket 282 of the latch bracket 258. Additionally, each of the pair of stop tabs 278 provides a stop tab bearing surface 279 that upon rotation of the latch 256 engages a rotation limiting surface 281 provided on the bracket wall 284. On being rotated to the engaged position, as shown in FIG. 14*b*, the catch member 266 provided on the latch 256 is received upon the keeper 290, therein holding the latch 256 in the engaged position. In this position, a second pivot surface 302 provided on the pivot bar 264 engages a second bearing wall 304 within the pivot bar pocket 282. To facilitate the engagement and disengagement between the latch 256 and the keeper 290, the keeper 290 may be provided with an inclined engagement surface 305 as shown in FIGS. 14*a* and 14*b*.

Latch—Version 4

Figure 15:
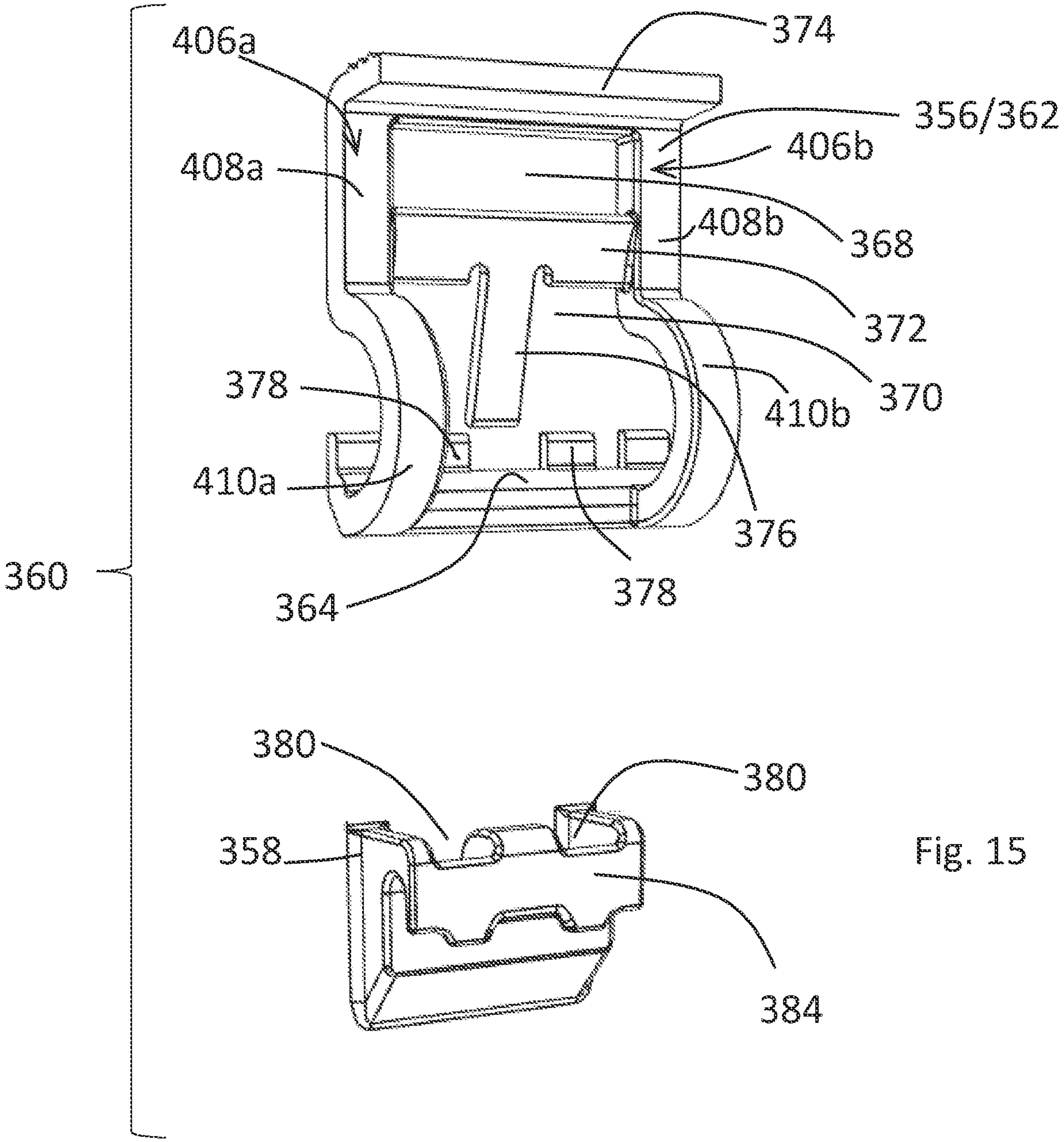
FIG. 15 is a perspective view of another alternative embodiment of a latch assembly, shown in isolation.

With reference now to FIG. 15, shown is another alternative embodiment for the latch assembly 360. The latch assembly 360 is configured in much the same way as the latch assembly 260 of the previous embodiment, and as such, only differences will be further detailed herein.

Similar to the previous latch assembly 260, the latch assembly 360 provides a retention tab 376 that extends from the cross member 372 in the direction of the pivot bar 364. The latch assembly 360 also provides a pair of stop tabs 378 extending from the pivot bar 364 in the direction of the cross member 372. Each of the stop tabs 378 is configured to seat in a corresponding stop tab aperture 380 provided in the bracket wall 384.

Figure 16:
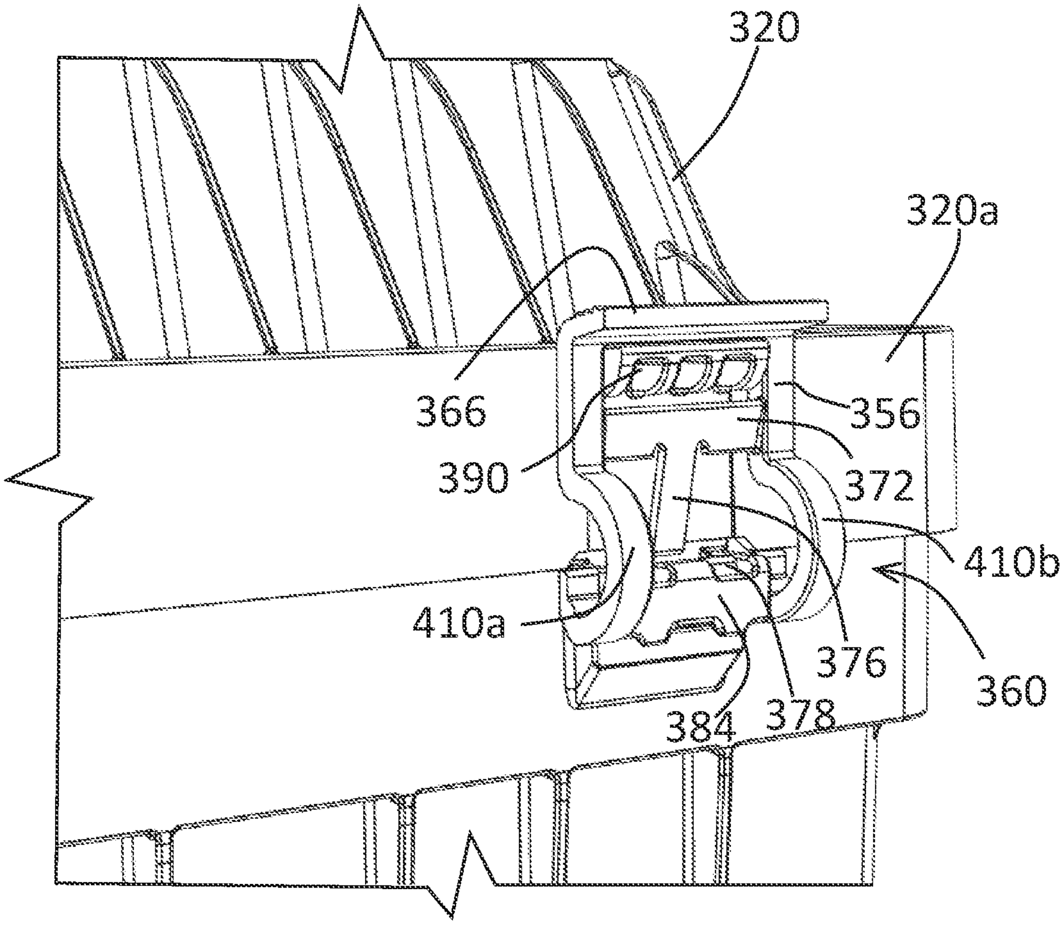
FIG. 16 is a partial perspective view of the latch assembly of FIG. 15, shown with the air cleaner assembly in the closed position.

The latch assembly 360 is shown in the assembled state in FIG. 16, with the housing 320 and the latch assembly 360 shown in the closed condition. In the closed condition, the catch member 366 of the latch 356 engages the keeper 390 provided on the upper housing member 320*a*. In this assembled and closed state, the retention tab 376 extends downwardly from the cross member 372, and towards the housing 320. Also visible is the positioning of the stop tabs 378 in the corresponding stop tab apertures 380 provided in the bracket wall 384.

In the previous embodiments hereof, the latch body 62 includes opposing side or edge members having a generally straightened or planar profile. Stated another way, adjacent to both the first catch aperture 68 and the second catch aperture 70, the side or edge members of the latch body 62 extend substantially perpendicular to the cross member 72. In the embodiment of FIGS. 15-17*b*, the latch 360 includes a latch body 362 having opposing side or edge members 406*a*, 406*b* that include a first or straightened segment 408*a*, 408*b* adjacent to the first catch aperture 368 thereof and a curved segment 410*a*, 410*b* adjacent to the second catch aperture 370 thereof. Each curved segment 410*a*, 410*b* includes a radius of curvature that extends radially outward in a direction away from the housing, i.e., in the same direction as the grasp tab 374. Each curved segment 410*a*, 410*b* extends or is disposed between the cross member 372 and the pivot bar 364. The curvature of the curved segments 410*a*, 410*b* of the latch body 362 improves flexibility during the assembly of the upper housing member 320*a* and the lower housing member 320*b*. Particularly, the curvature of the curved segments 410*a*, 410*b* of the latch body 362 permits a user to flex or bend the latch body 362 into position during assembly of the upper housing member 320*a* and the lower housing member 320*b*. The ability to flex or bend the latch body 362 into position advantageously eliminates the need for a preload tool or machine that may otherwise be required to position the latch during assembly. The latch 356 has increased flexibility to be moved into position without the need for a preload tool as described above, and without surpassing prescribed load guidelines pertaining thereto.

Figure 17A:
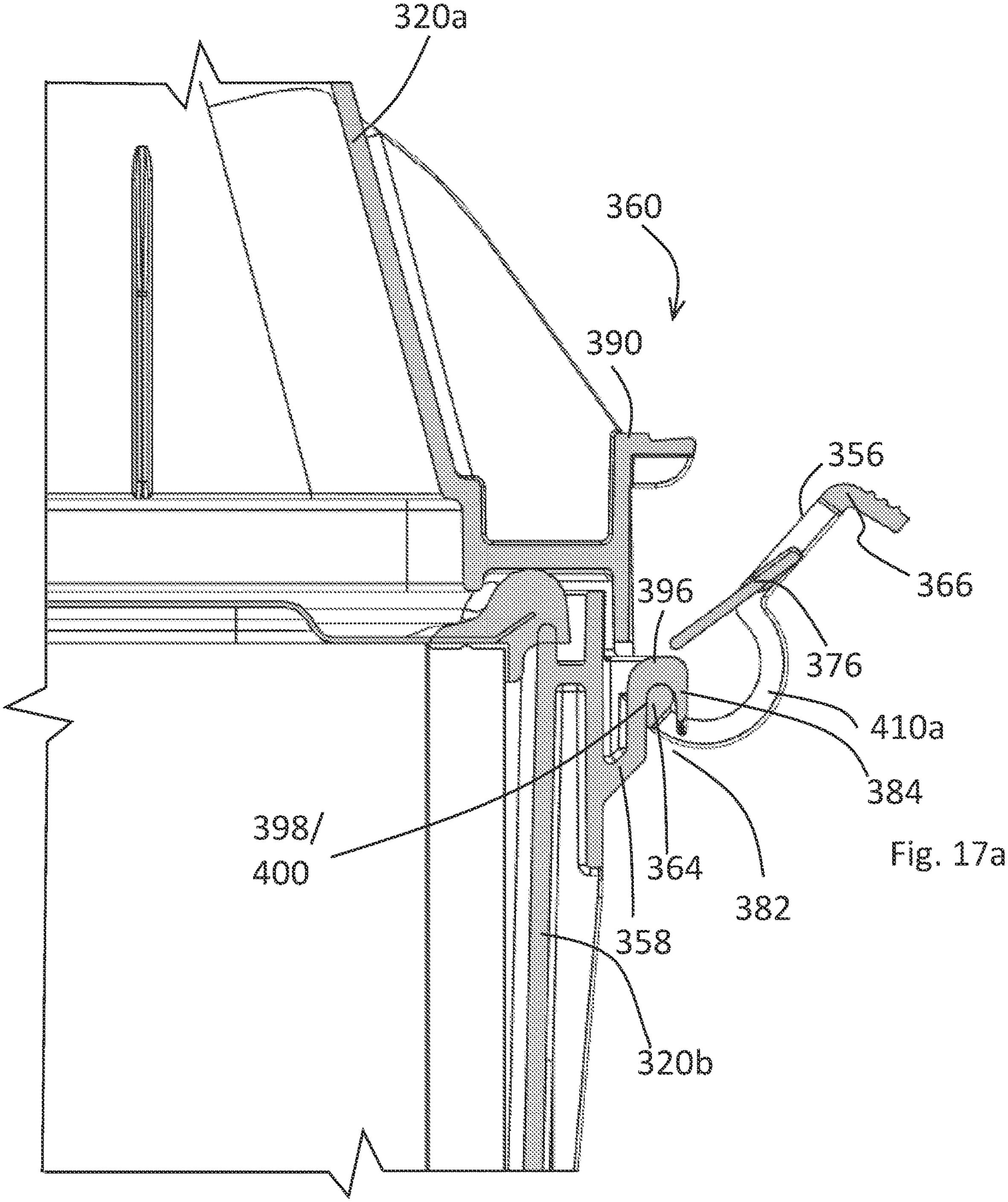
FIG. 17*a* is a partial sectional view of the latch assembly of FIG. 15, shown with the latch assembly in the open position.
Figure 17B:
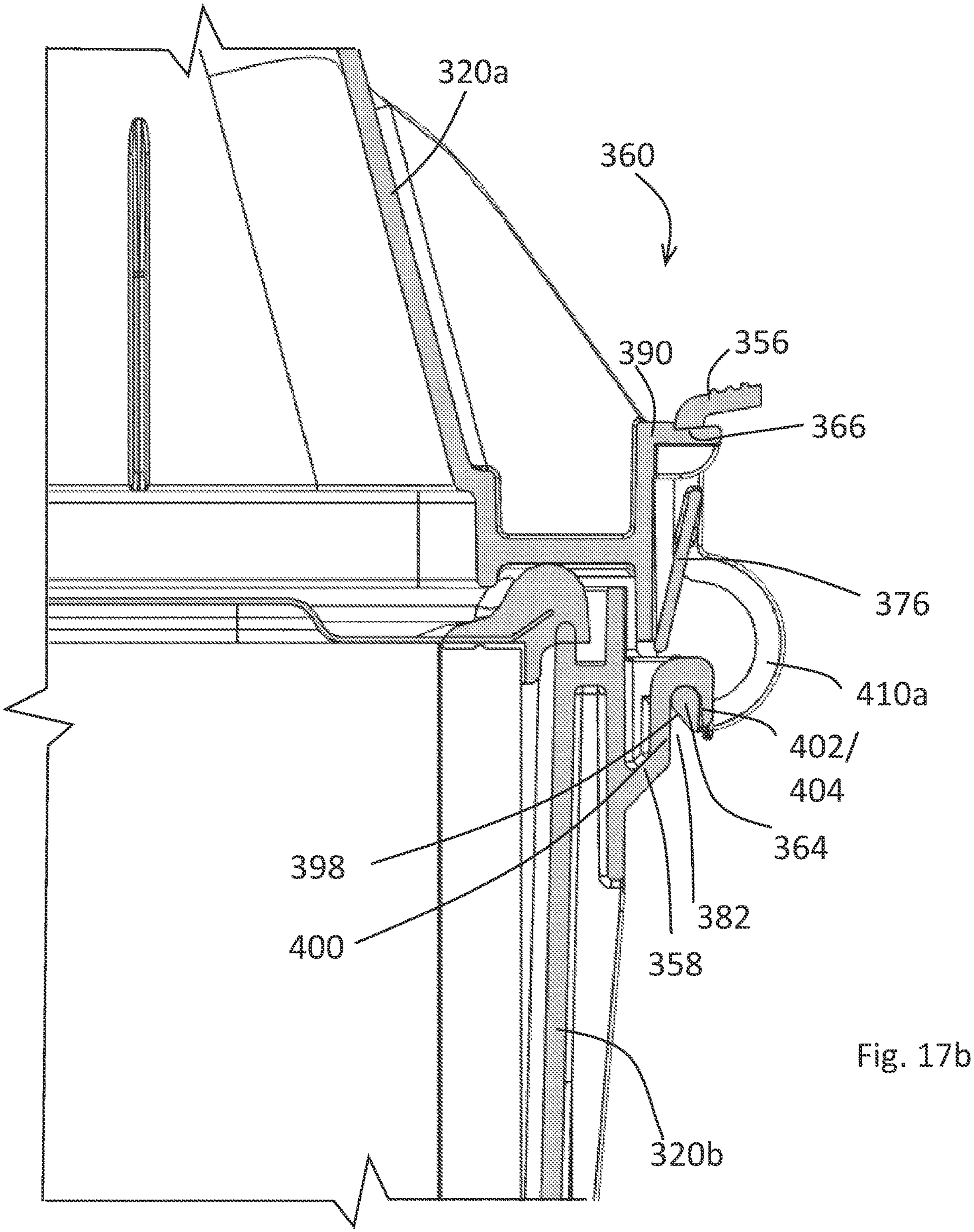
FIG. 17*b* is a partial sectional view of the latch assembly of FIG. 15, shown with the latch assembly in the closed position.

For further discussion, the operation of the latch assembly 360 is shown in FIG. 17*a* (open) and FIG. 17*b* (closed). In the open condition (FIG. 17*a*), the latch 356 is shown rotated approximately 45° and therein disengaged from the keeper 390 provided on the upper housing member 320*a*. The latch 356 is maintained in this rotated disengaged position without falling away from the latch bracket 358 through an interference/obstruction fit provided by the retention tab 376. As shown, the retention tab 376 is dimensioned with a length that keeps it obstructed by an upper wall surface 396 of the latch bracket 358. In this way, the latch 356 cannot fall off the latch bracket 358 when in the 45° position, as shown. In addition, to keep the latch 356 from rotating beyond the approximately 45° shown, the pivot bar 364 of the latch 356 is provided with a first pivot surface 398 that engages a first bearing wall 400 within the pivot bar pocket 382 of the latch bracket 358. Additionally, although not shown the sectional view of FIG. 17*a*, each of the pair of stop tabs 378 provides a stop tab bearing surface (similar to stop tab bearing surface 279) that upon rotation of the latch 356 engages a rotation limiting surface (similar to rotation limiting surface 281) provided on the bracket wall 384. On being rotated to the engaged position, as shown in FIG. 17*b*, the catch member 366 provided on the latch 356 is received upon the keeper 390, therein holding the latch 356 in the engaged position. In this position, a second pivot surface 402 provided on the pivot bar 364 engages a second bearing wall 404 within the pivot bar pocket 382. To facilitate the engagement and disengagement between the latch 356 and the keeper 390, the keeper 390 may be provided with an inclined engagement surface.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An air cleaner apparatus for an automotive air induction system, the apparatus comprising:
- a housing having an upper housing member and a lower housing member;
- an inlet provided on the lower housing member;
- an outlet provided on the upper housing member; and
- a replaceable serviceable filter,
- wherein the upper housing member and the lower housing member are connected at an interface therebetween to define an internal volume, and
- wherein the filter is mounted within the internal volume proximal the interface, and
- wherein the upper and lower housing members are maintained in an assembled state using a serviceable latch assembly, the serviceable latch assembly including a latch and a latch bracket operably mounted on the lower housing member, and wherein the serviceable latch assembly cooperates with a keeper provided on the upper housing member, and
- wherein the latch includes a latch body having a pivot bar, a catch member opposite the pivot bar, a first catch aperture, and a second catch aperture, where the first and second catch apertures are separated by a cross member.

2. The air cleaner apparatus according to claim 1, wherein a compressible seal is provided at the interface between the upper and lower housing members.

3. The air cleaner apparatus according to claim 2, wherein the seal is mounted upon a filter flange provided on a filter frame configured to support the filter at the interface between the upper and lower housing members.

4. The air cleaner apparatus according to claim 3, wherein the filter frame is a porous filter frame that permits air to flow from the lower housing member to the upper housing member.

5. The air cleaner apparatus according to claim 1, wherein the latch body is unitary in construction.

6. The air cleaner apparatus according to claim 1, wherein the latch further includes an extension member extending from the cross member.

7. The air cleaner apparatus according to claim 6, wherein the extension member includes an offset portion that applies a compressive force upon a portion of a bracket wall of the latch bracket, the compressive force serving to frictionally maintain the latch in a disengaged position, and to prevent the latch from falling away from the latch bracket when disengaged.

8. The air cleaner apparatus according to claim 7, wherein the latch when in the disengaged position is pivoted approximately 45° relative to the engaged position.

9. The air cleaner apparatus according to claim 1, wherein the latch further includes a retention tab that extends from the cross member.

10. The air cleaner apparatus according to claim 9, wherein the retention tab prevents the latch from falling away from the latch bracket through an interference/obstruction fit.

11. The air cleaner apparatus according to claim 10, wherein the retention tab is dimensioned with a length that keeps it obstructed by an upper wall surface of the latch bracket.

12. The air cleaner apparatus according to claim 1, wherein the pivot bar is provided with a first pivot surface that engages a first bearing wall within a pivot bar pocket of the latch bracket, to prevent the latch from rotating beyond approximately 45° when in the disengaged position.

13. The air cleaner apparatus according to claim 1, wherein the latch further includes a pair of stop tabs extending from the pivot bar, each of the stop tabs including a stop tab bearing surface to prevent over-rotation of the latch in the open position.

14. The air cleaner apparatus according to claim 1, wherein the latch body further includes opposing side members, each side member extending between the pivot bar and the catch member, and wherein each side member has a straightened profile.

15. The air cleaner apparatus according to claim 1, wherein the latch body further includes opposing side members, each side member extending between the pivot bar and the catch member, and wherein each side member has a curved profile.

16. The air cleaner apparatus according to claim 15, wherein each side member includes a straightened segment adjacent to the first catch aperture and a curved segment adjacent to the second catch aperture.

17. The air cleaner apparatus according to claim 16, wherein curved segment includes a radius of curvature that extends radially outward in a direction away from the housing.

* * * * *